April 7, 1925.                                          1,532,287
H. WEICHSEL
ALTERNATING CURRENT MOTOR
Filed March 17, 1924
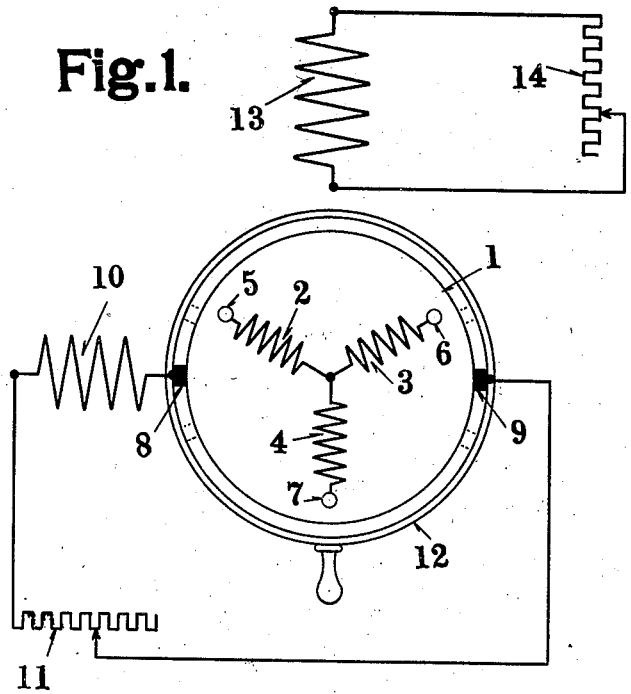
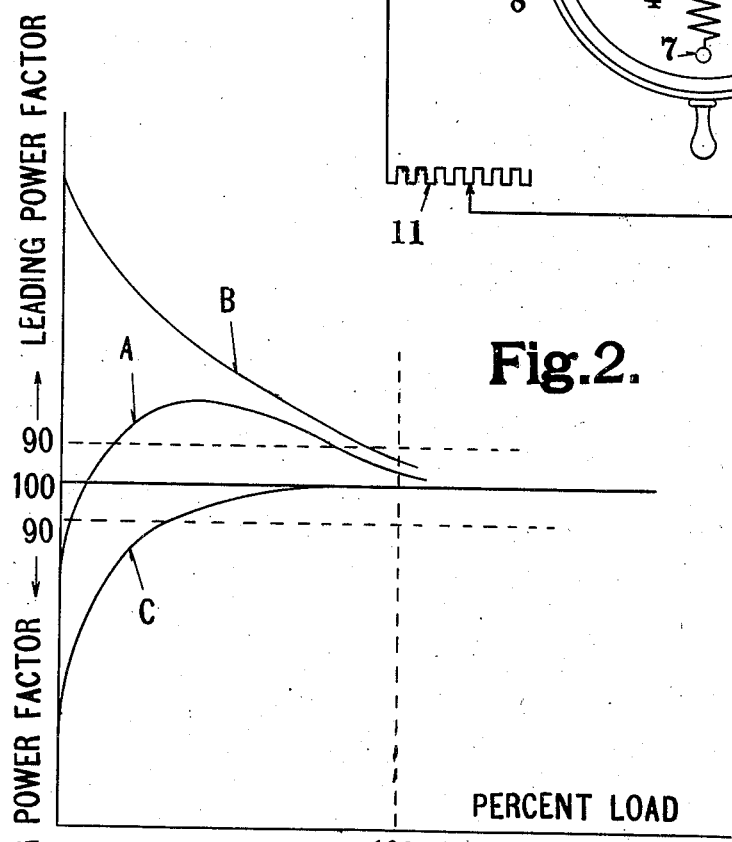
INVENTOR
Hans Weichsel
BY G.E. Huffman
ATTORNEY Patented Apr. 7, 1925.

1,532,287

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed March 17, 1924. Serial No. 699,866.

*To all whom it may concern:*

Be it known that I, HANS WEICHSEL, a citizen of the United States of America, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to an alternating current motor capable of operating both as an induction motor and as a synchronous motor, its object being to provide a machine of this character the power factor of which may be readily adjusted to suit conditions under which the motor is required to operate without injuriously affecting the pull in torque of the motor.

In the accompanying drawings Figure 1 is a diagrammatic representation of a motor embodying my invention; and Figure 2 is an explanatory diagram.

My motor is constructed without defined polar projections on either member, and in the form illustrated the primary or inducing member revolves. This member carries a commuted winding 1 and interconnected polyphase windings 2, 3 and 4, to which current is supplied through slip-rings 5, 6 and 7. As will be understood the polyphase windings may be interconnected with the commuted winding if desired, but I prefer that these windings be separate in order that polyphase voltages, which may exist on the polyphase winding, may not be impressed upon the commuted winding, and therefore insulation provisions need not be made in the exciting circuit to take care of excessive voltages which might exist between this circuit and ground in case one of the line wires should be grounded.

The brushes 8—9 cooperating with the commutator are in circuit with the unidirectional exciting winding 10 on the stator through variable resistance 11, and in the position shown in the drawing their axis coincides with the axis of the winding 10. These brushes are mounted on a rocker-arm 12 by means of which they can be shifted to take up positions indicated by the dotted lines, or intermediate positions. The stator is also provided with a starting winding 13 displaced 90 electrical degrees from the winding 10 and adapted to be closed over an adjustable resistance 14.

Referring to the operation of a machine of the type described, resistance is included in the circuit of each of the stator windings 10 and 13 at starting, and these windings act as polyphase induced windings with the result that the machine will start with a good torque and relatively small current. As the speed increases the resistances in circuit with the stator windings can be reduced in one or more steps until the winding 13 is short-circuited and the resistance of the circuit containing the winding 10 has been brought back to its operating value. As the speed increases the induction motor torque of the machine decreases and becomes too small to bring the machine into synchronism, but since the winding 10 is so connected to the rotor that the E. M. F. induced therein, and the E. M. F. conductively impressed thereon from the commutator are in such relation as to phase and frequency as to cooperate in producing current in the winding 10, a synchronizing torque is developed tending to pull the machine into synchronism. This synchronizing torque has its highest value when the brush axis and the axis of the winding 10 substantially coincide, as shown in Figure 1, and it is therefore desirable that in making adjustments to influence the power factor of the machine that this value of the synchronizing torque be reduced as little as possible. Among the reasons for providing means whereby the power factor characteristics of the machine can be varied at will, are that it may or may not be connected in service to a line carrying other machines which may have a leading, lagging or substantially unity power factor. If said machines have lagging power factor, for example, it is advantageous that my machine have a leading power factor to bring the line power factor nearer unity.

It will be understood that change of brush position with respect to the axis of the exciting winding will change the power factor curve of the machine and I accomplish my object of being able to change this curve in such manner as to produce leading or lagging power factor as desired at fractional loads and still retain a high pull in torque by so adjusting the magnitude of the excitation that the machine will have approximately unity power factor at full load when the axis of the brushes 8—9 coincides with the axis of the winding 10. By approximately unity power factor I mean a power factor within ten per cent of unity.

In Figure 2 curve A represents a suitable power factor curve for the position referred to. This provision with respect to power factor at full load with the brushes in the axis of the exciting winding, makes it possible to produce a leading power factor curve over the fractional load range of the machine by shifting the brushes only a very few degrees in one direction, and to produce a power factor curve C having a lag at low loads, by shifting the brushes only a few degrees in the other direction, the extent of shift of brushes in each case not being sufficient to adversely affect the pull in torque to an appreciable extent.

While I have described my invention embodied in a polyphase motor it is also applicable to a single phase machine. It will also be understood that instead of the rotor being the inducing member as shown, it may be the induced member, in which case the brushes would be made to rotate with said member.

Having fully described my invention, what I claim as new and desire to secure by Letters Patent of the United States is:

1. In a synchronous induction motor, the combination of an inducing member provided with a commutator and brushes thereon, means for supplying alternating current to the inducing member, an induced member having an exciting winding in circuit with the brushes, said exciting circuit being adjusted to cause the motor to operate with approximately unity power factor at full load when the axis of the brushes coincides with the axis of the exciting winding.

2. In a synchronous induction motor, the combination of an inducing member provided with a commutator and brushes thereon, means for supplying alternating current to the inducing member, an induced member having an exciting winding in circuit with the brushes, said exciting circuit being adjusted to cause the motor to operate with approximately unity power factor at full load when the axis of the brushes coincides with the axis of the exciting winding, and means for shifting the brushes.

3. In a synchronous induction motor, the combination of an inducing member provided with a commutator and brushes thereon, means for supplying alternating current to the inducing member, an induced member having an exciting winding in circuit with the brushes, said exciting circuit being adjusted to cause the motor to operate with approximately unity power factor at full load when the axis of the brushes coincides with the axis of the exciting winding, and means for shifting the brush axis in either direction from the winding axis.

In testimony whereof, I have hereunto set my hand this the 13 day of March, 1924.

HANS WEICHSEL